March 1, 1949.  A. DE V. HARNETT  2,463,033

CIRCUIT CONNECTOR

Filed Sept. 19, 1945

INVENTOR.
A. De Vere Harnett,
BY Mueller, Dodds & Mason
Attys.

Patented Mar. 1, 1949

2,463,033

UNITED STATES PATENT OFFICE 2,463,033

CIRCUIT CONNECTOR

A. De Vere Harnett, Racine, Wis.

Application September 19, 1945, Serial No. 617,199

7 Claims. (Cl. 174—59)

The present invention relates to electric circuit connectors and more particularly to an improved plural wire circuit connector adapted for support within a conduit box.

It is conventional practice in wiring houses and other structures for electric current distribution to employ conduit boxes for enclosing circuit conductor interconnections. Usually the circuit junctions are formed by mechanically joining the circuit conductors, and then soldering and taping the joints. Following this, the joined conductor parts are forced into the conduit box and covered by the box lid. This procedure is quite laborious and hence costly, principally because of the soldering and taping operations involved.

It is an object of the present invention, therefore, to provide an improved circuit connector which permits reliable and insulated interconnection of branch and source conductors of a plural conductor circuit without resort to joint soldering and taping.

It is another object of the invention to provide a circuit connector of the character described which is of simple and rugged construction and may be economically manufactured in production quantities.

The invention, both as to its organization and method of use, together with further objects and advantages thereof, will best be understood by reference to the following specification taken in connection with the accompanying drawings, in which.

Figure 1:
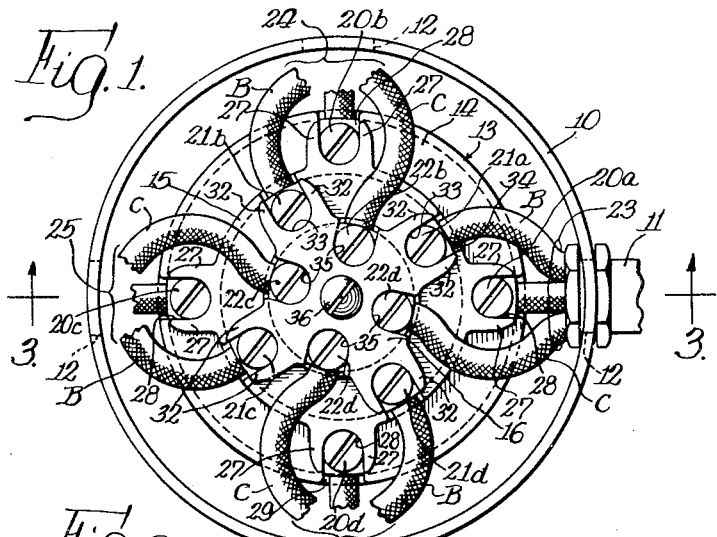
Fig. 1 is a top plan view illustrating the present improved connector assembled in a conduit box.
Figure 2:
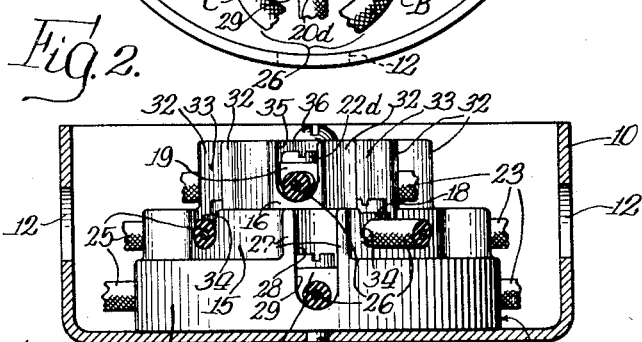
Fig. 2 is a side view of the connector and box shown in Fig. 1.
Figures 3, 4:
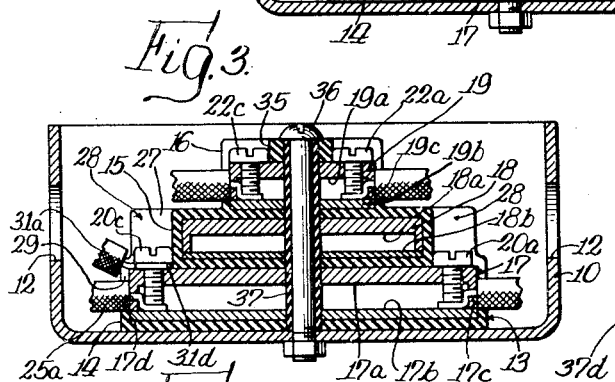
Fig. 3 is a full sectional view of the connector taken along the lines 3—3 in Fig. 1.
Fig. 4 is a view in perspective illustrating a modified terminal structure which may be embodied in the connector.

Referring now to the drawing and more particularly to Figs. 1, 2 and 3 thereof, the present improved connector is there illustrated in its embodiment within a conduit box 10 having conduit openings 12 in the side walls thereof at which conduit termination may be made. The illustrated connector is adapted for use in three-conductor circuits and may be employed to interconnect the source conductors 23 brought into the conduit box 10 through a conduit 11 with three sets of branch circuit conductors 24, 25 and 26 which exit from the conduit box through conduits terminating at the three illustrated unoccupied conduit openings 12.

Briefly considered, the present improved connector comprises a stepped body or block of insulating material 13, formed of Bakelite or another similar moldable insulating material, in which are embedded terminals 17, 18 and 19 in the number of one terminal for each conductor of the plural conductor circuit. These conductive terminals are of hollow two-part construction, are disposed one above the other in the insulating block 13, and are of successively smaller dimensions transversely of the block in the order of their height in the block. Specifically, the terminal 17 is comprised of an inverted conductive cup 17a closed at its bottom side by a metal disk 17b which engages the rim of the cup side wall 17c. These two terminal parts are embedded within the base portion 14 of the block 13 and are of larger diameter than the corresponding terminal parts 18a and 18b making up the second terminal 18 embedded within the stepped portion 15 of the block. Similarly, the inverted cup 18a and closure disk 18b are of larger diameter than the corresponding terminal parts 19a and 19b making up the terminal 19 embedded in the top stepped portion 16 of the insulating block 13.

At four equiangularly spaced points around the sides of the block 13 the side wall 17c of the terminal part 17 is provided with openings for receiving the stripped ends of corresponding conductors in the circuit conductor sets 23, 24, 25 and 26. In registry with these four terminal part openings, recesses are formed to project inwardly from the sides of the block 13 to permit insertion of the stripped conductor ends into the terminal wall openings. More specifically, and as best shown in Fig. 2 of the drawing, a recess 29 is formed in the side wall of the insulating block base portion 14 to expose the circuit conductor opening 17d through the side wall of the terminal cup 17a through which the stripped end of the circuit conductor 25a may be inserted into the terminal cup 17a. Thus, the stripped end portion of the conductor may be extended into the space between the two terminal parts 17a and 17b. Terminal screws 20a, 20b, 20c and 20d threaded into the terminal cup 17a through the top wall thereof at points in alignment with the four side wall openings through the cup are employed to deform the circuit conductor ends interiorly of the terminal 17, i. e. in the space between the terminal parts 17a and 17b. Thus, the terminal screw 20c is shown in Fig. 3 of the drawing as being threaded through the top wall of the terminal part 17a to bend the end portion of the conductor 25a downwardly and into engagement with the terminal part 17b, thereby to provide a firm mechanical interlock between the stripped conductor end and the terminal 17. In order to minimize any possibility of the terminal screws 20a, 20b, 20c and 20d being inadvertently connected with the terminals 18 and 19 to establish a short circuit, provisions are made for fully insulating these screws so long as they remain in threaded engagement with the terminal cup 17a. Specifically, the insulating block 13 is formed with guard portions 27 which project outwardly from the stepped portion 15 of the block to define a recess 28 therebetween within which the screw 20c is only free to move longitudinally of its threaded portion. Similar insulating parts 27 also formed as an integral part of the block 13 to project outwardly from the stepped portion 15 of the block and having recesses 28 formed therebetween, are provided to guard the other three terminal screws 20a, 20b and 20d.

With the structure just described, it will be understood that four portions of the terminal part 17a are exposed within the openings 29 and recesses 28 associated with the four terminal screws 20a, 20b, 20c and 20d, and that circuit connections may be made to the terminal 17 through the side wall openings provided at these four points around the structure. If it is desired to increase the number of branch circuit connections to the connector, additional circuit conductors may be terminated at one or more of the four described connection points to the terminal 17. Thus, and as shown in Fig. 3 of the drawings, a circuit conductor 31a having a stripped end 31d in the form of an eyelet embracing the threaded portion of the screw 20c may be connected to the terminal 17 by clamping the eyelet 31d between the head of this screw and the terminal part 17a. This type of connection may also be preferable and used in lieu of that described above in terminating heavy gauge conductors of such diameter as not to be receivable within the side wall opening 17d, for example.

The facilities provided in association with the terminals 18 and 19 for making circuit conductor connections to these terminals are exactly the same as described above with reference to the terminal 17. Thus, the B conductors of the circuits 23, 24, 25, and 26 are stripped and extended through the four openings provided in the side wall of the terminal part 18a, and are deformed against the terminal part 18b by means of terminal screws 21a, 21b, 21c and 21d. These terminal screws are partially surrounded to insulate the same by means of portions 32 of the insulating block 13 which project radially outward from the top stepped portion 16 of the block and have formed recesses 33 therebetween within which the terminal screws are received. Here also, the side wall portions of the terminal part 18a in alignment with the terminal screws 21a, 21b, 21c and 21d are exposed through openings 34 formed to extend inwardly from the sides of the stepped portion 15 of the insulating block.

The C conductors of the four circuits 23, 24, 25 and 26 are terminated at the third terminal 19 by projecting the stripped ends thereof into openings in the side wall 19c of the terminal part 19a. These inwardly extended conductor ends are deformed against the terminal part 19b by means of terminal screws 22a, 22b, 22c and 22d threaded through the top wall of the terminal part 19a. To expose the side and top walls of the terminal part 19a and receive the screws 22a, 22b, 22c and 22d, the upper stepped portion 16 of the block 13 is recessed inwardly from the sides thereof as indicated at 35 at four points around its perimeter. Thus, the non-recessed portions of the step 16 serve partially to surround the screws 22a, 22b, 22c and 22d thereby to minimize the possibility of inadvertent connection of these screws with the other terminals of the connector.

For the purpose of fixedly mounting the described connector within the conduit box 10, the described structure is, after construction thereof, drilled through its center to accommodate an assembly screw 36. A fiber sleeve 37 telescoped over the screw 36 may be used to prevent this screw from short circuiting the terminals 17, 18 and 19. In this regard it is noted that the enumerated terminals are embedded in the block 13 during molding thereof and that the terminal parts 17b, 18b and 19b serve to prevent the insulating material from entering the hollow space within the terminal parts 17a, 18a and 19a. Also, by the use of appropriate molding dies, the desired structural configuration, including the described recesses and openings for terminal wall exposure, are formed during the molding operation. The side and top wall openings in the terminal part 17a, 18a and 19a are formed after the molding operation is complete, the final operation being that of tapping the top wall openings in these parts to receive the terminal screws 20, 21, and 22.

Figure 5:
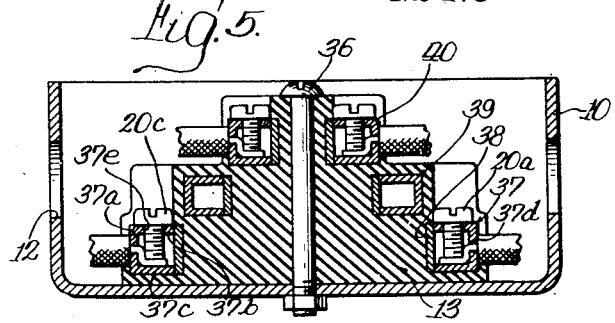
Fig. 5 is a side view in full section of a connector having the terminals of Fig. 4 embodied therein.

In the modified terminal structure illustrated in Figs. 4 and 5 of the drawing, the terminals 17, 18 and 19 are in the form of conductive rings. Thus, and as best shown in Fig. 4 of the drawing, the terminal 17 comprises an internally channeled conductive ring 37 having top and bottom walls 37b and 37c and a side wall 37a through which the wire receiving openings 37d are formed at spaced points around the circumference thereof. The top wall 37b is provided with threaded openings 37e for receiving the terminal screws 20a, 20b, 20c and 20d. These top wall-openings are in radial alignment with the side wall openings 37d. The internal edges of the top and bottom walls 37b and 37c are bridged by a cylindrical part 38 preferably having a forced fit with the engaged edges of the walls 37b and 37c so that the space between these walls is effectively sealed. The other two terminals 39 and 40 are identical in construction with the terminal 37 just described but are of successively smaller diameter. Aside from this difference in the construction of the terminals 17, 18 and 19, the connector structure as shown in Fig. 5 of the drawings, is identical with that illustrated in Figs. 1, 2 and 3 and described above. From a consideration of this modified structure, it will be noted that the structure is characterized by two advantages. First, the bottom and side walls 37c and 37a of the terminal part 37 are integral, so that the terminal screws 20 may be threaded through the top wall 37b tightly to clamp the conductor ends against the bottom wall 37c without stressing the insulating material of the block 13. Secondly, the conductive terminals 37, 39 and 40 as thus formed of ring like configuration, are removed from the center region of the connector structure. Accordingly, this structure may be drilled through the center portion thereof to receive an assembly screw 36 with the assurance that this screw will be completely insulated from the terminals 37, 39 and 40.

From the above explanation it will be understood that the present invention affords a convenient connector for facilitating the interconnection of circuit conductors within a conduit box without soldering or taping operations. Preferably this is accomplished by making the described circuit connections with the connector terminals before the connector is assembled within the conduit box. After the connections are made, the connector may be assembled within the box, and the box covered, thus completing the job.

While there have been described what are at present considered to be the preferred embodiments of the invention, it will be understood that various modifications may be made therein which are within the true spirit and scope of the invention as defined in the appended claims.

I claim:

1. A plural conductor-plural circuit connector comprising a block of insulating material, conductive terminal rings embedded in said block one above the other in the number of one terminal ring for each conductor of a connecting circuit, said terminal rings being of successively smaller dimensions transversely of said block in the order of height in said block, said block being provided with recesses extending inwardly from the sides thereof at spaced points therearound in which said terminal rings are exposed for circuit conductor connection to said terminal rings, and terminal screws disposed in said recesses and threaded into said terminal rings to cooperate with said terminal rings in making circuit conductor connections thereto.

2. A plural conductor-plural circuit connector comprising a block of insulating material, hollow conductive terminal rings embedded in said block one above the other in the number of one terminal ring for each conductor of a connecting circuit, said terminal rings being of successively smaller dimensions transversely of said block in the order of height in said block and being provided with conductor receiving openings through the side walls thereof at spaced points therearound, said block being provided with openings extending inwardly from the sides thereof in registry with said terminal ring openings through which circuit conductor ends may be inserted into said terminal ring openings, and terminal screws threaded into said terminal rings through the top walls thereof at points in alignment with said terminal ring openings for deforming circuit conductor ends inserted into said openings internally of said terminal rings.

3. A plural conductor-plural circuit connector comprising a block of insulating material, hollow conductive terminal rings embedded in said block one above the other in the number of one terminal ring for each conductor of a connecting circuit, said terminal rings being of successively smaller dimensions transversely of said block in the order of height in said block and being provided with conductor receiving openings through the side walls thereof at spaced points therearound, said block being provided with openings extending inwardly from the sides thereof in registry with said terminal ring openings and in which said terminal rings are exposed for insertion of circuit conductor ends into said openings, and terminal screws disposed in said recesses and threaded into said terminal rings through the top walls thereof at points in alignment with said terminal ring openings for deforming circuit conductor ends inserted into said openings internally of said terminal rings.

4. A plural-wire-circuit connector adapted for support within a conduit box, comprising a stepped block of insulating material, conductive terminal rings embedded in said block one above the other in the number of one terminal ring for each conductor of a connecting circuit, said terminal rings being of successively smaller diameter in the order of height in said block and at least a part thereof being supported approximately at different step levels of said block, each of said terminal rings being accessible at a plurality of points around said block for attachment of circuit conductors thereto.

5. A plural-wire-circuit connector adapted for support within a conduit box, comprising a stepped block of insulating material, conductive terminal rings embedded in said block one above the other in the number of one terminal ring for each conductor of a connecting circuit, said terminal rings being of successively smaller diameter in the order of height in said block and at least a part thereof being supported approximately at different step levels of said block, each of said terminal rings being exposed at a plurality of points around said block for attachment of circuit conductors thereto, said block including portions projecting from the steps thereof and defining recesses overlying the exposed portions of said terminal rings, and terminal screws disposed in said recesses and threaded into said terminal rings to cooperate with said exposed portions of said terminal rings in making circuit conductor connections thereto.

6. A plural-wire-circuit connector adapted for support within a conduit box, comprising a stepped block of insulating material, hollow conductive terminal rings embedded in said block one above the other in the number of one terminal ring for each conductor of a connecting circuit, said terminal rings being of successively smaller diameter in the order of vertical disposition in said block and at least a part thereof being supported approximately at different step levels of said block, said terminal rings also being provided with conductor receiving openings through the side walls thereof at spaced points therearound, said block being provided with openings extending inwardly from the sides thereof in registry with said terminal ring openings through which circuit conductor ends may be inserted into said terminal ring openings, and terminal screws threaded into said terminal rings through the top walls thereof at points in alignment with said terminal ring openings for deforming circuit conductor ends inserted into said openings internally of said terminal rings.

7. A plural-wire-circuit connector adapted for support within a conduit box, comprising a stepped block of insulating material, hollow conductive terminal rings embedded in said block one above the other in the number of one terminal ring for each conductor of a connecting circuit, said terminal rings being of successively smaller diameter in the order of vertical disposition in said block and at least a part thereof being supported approximately at different step levels of said block, said terminal rings also being provided with conductor receiving openings through the edge walls thereof at spaced points therearound, said block being provided with openings extending inwardly from the sides thereof in registry with said terminal ring openings through which circuit conductor ends may be inserted into said terminal ring openings, and terminal screws threaded into said terminal rings through the top walls thereof at points in alignment with said terminal ring openings for deforming circuit conductor ends inserted into said openings internally of said terminal rings, said block also including portions projecting from the steps thereof and recessed to receive and partially surround certain of said terminal screws.

A. DE VERE HARNETT.

REFERENCES CITED

The following references are of record in the file of this patent:

UNITED STATES PATENTS

| Number | Name | Date |
|---|---|---|
| 456,611 | Balsley | July 28, 1891 |
| 1,586,709 | Schwinger | June 1, 1926 |
| 1,915,199 | Park | June 20, 1933 |